(12) United States Patent
Sundararajan et al.

(10) Patent No.: US 7,640,263 B2
(45) Date of Patent: Dec. 29, 2009

(54) QUEUED SYSTEM EVENT NOTIFICATION AND MAINTENANCE

(75) Inventors: Narashimhan Sundararajan, Redmond, WA (US); Iulian Catalin Stafie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 11/157,288

(22) Filed: Jun. 20, 2005

(65) Prior Publication Data

US 2006/0288037 A1   Dec. 21, 2006

(51) Int. Cl.
*G06F 7/00* (2006.01)

(52) U.S. Cl. ............... 707/102; 707/3; 707/6; 707/103 R; 707/206; 709/203; 709/206; 709/224; 705/67

(58) Field of Classification Search ........................ None
See application file for complete search history.

(56) References Cited

U.S. PATENT DOCUMENTS

| | | | |
|---|---|---|---|
| 5,727,203 A * | 3/1998 | Hapner et al. ........... 707/103 R |
| 7,379,963 B1 * | 5/2008 | Khare et al. ............... 709/203 |
| 2002/0046188 A1 * | 4/2002 | Burges et al. ............... 705/67 |
| 2002/0133507 A1 * | 9/2002 | Holenstein et al. .......... 707/200 |
| 2003/0135556 A1 * | 7/2003 | Holdsworth ................. 709/206 |
| 2004/0002972 A1 * | 1/2004 | Pather et al. ................... 707/6 |
| 2004/0143659 A1 * | 7/2004 | Milliken et al. ............. 709/224 |

* cited by examiner

*Primary Examiner*—Tony Mahmoudi
*Assistant Examiner*—Michele C Choi
(74) *Attorney, Agent, or Firm*—Workman Nydegger

(57) ABSTRACT

Embodiments provide for a sub-pub architecture that is independent of the number of subscriptions by neither evaluating, nor storing the results of, each event against each subscription. Instead, a canonical subscription is determined a priori, which includes a superset of common property filters for similar events. Properties of events happening in a data store are evaluated against this canonical subscription and the results are stored typically once as event records. When a subscription registrar requests notification of events that match a subscription's filter criteria, only the subset of event records corresponding to the appropriate superset of common properties are evaluated against the subscription. Other embodiments also include methods, systems, and computer program products for determining the subset of event records to be compared against a subscription's filter criteria, while ensuring that out of sequence, uncommitted events are not lost.

13 Claims, 4 Drawing Sheets

QUEUED SYSTEM EVENT NOTIFICATION AND MAINTENANCE

FIELD OF THE INVENTION

The present invention generally relates to queued event notification and maintenance systems

BACKGROUND OF THE INVENTION

Computerized systems provide many advantages towards peoples' ability to perform tasks. Indeed, the computer systems ability to process information has transformed the way we live and work. Computing systems now take a wide verity of forms including desktop computers, laptop computers, tablet PCs, Personal Digital Assistances (PDAs), and the like. Even household devices (such as refrigerators, ovens, sewing machines, security systems, and the like) have varying levels of processing capability, and thus may be computing systems. Processing capabilities continue to be incorporated into devices that traditionally did not have such processing power. Accordingly, the adversity trend of computing systems will likely increase.

Along with computing systems, the Internet has revolutionized the way people communicate and has ushered in a new era in human history often termed the "information age." In essence, the Internet includes a large constellation of networked computers that are spread out over much of the world. Sophisticated computers, software, and networking technology have made communication over the Internet fairly straight forward from the view point of the end user. In order to communicate over a network, typically one computing system constructs or otherwise accesses an electronic message and transmits the electronic message over a network to another computing system. Portions of the electronic message may be read by human users as when the electronic message is an email, instant message, an appointment, or the like. Alternatively, or in conjunction, the electronic message may be read by an application running on the receiving computing system. The electronic message may further be constructed by an application running on the sending computing system with the possible assistance of a human user.

In some environments, applications communicate with one another using queued message communication. Queued communication includes mechanisms for a sending application to write a message into a sending queue, the sending queue to transfer the message to a receiving queue, and for a receiving application to read the message from the receiving queue. The queues maintain communication state outside of the communicating parties, and provide a level of indirection between them. Accordingly, queued messaging provides reliable communication between loosely coupled applications. Senders and receivers of messages use intermediary queue managers to communicate, and may independently shut down and restart and may even have non-overlapping lifetimes. Queuing also allows clients and servers to send and receive messages "at their own pace" with the queue taking up the slack at either end.

One model of a queued messaging system is a published/subscribed (often termed pub-sub), which is an event driven architecture with the notions of subscriptions, events, and notifications. A subscription is a request made by a consumer or registrar to a data store, expressing interest in some change thereto (typically by specifying a scope and a criterion) that are expected to happen in the data store. Events, on the other hand, are actual changes that happen in the data store. When an event happens in a data store for which interest was expressed by a subscription, a notification is published and subsequently sent to a registrar of that subscription notifying them of the event.

There are many examples of such pub-sub uses. For example, a user with online access that has previous booked or otherwise scheduled travel arrangements such as flight plans, hotel accommodations, car rentals, and meeting schedules may wish to be notified of any changes in his travel plans. Accordingly, a registrar can be developed for a subscription that periodically polls one or more servers with knowledge of the user's travel plan events. The registrar may then inform the user of any changes identified.

Another example of where subscriptions are useful is in an email type environment where a user wishes to be notified of certain events and/or assigns an assistant to act on behalf of such events. For example, the user or an assistant may wish to know of events such as: when appointments have been scheduled and/or changed; the arrival of urgent email messages; when messages or folders have been created, deleted, updated, etc.; activities that happen on specific mailboxes; and other various events. Upon notification, the user or assistant may take action as appropriate.

Although pub-sub systems provide a convenient way of notifying users and registrars of events, existing implementations do not perform well under the following two conditions: a large number of subscriptions; and/or a very high event rate. Typically, all of the events are stored in an events table and all of the subscriptions are stored in a subscription table. Each event within the events table is then evaluated against each subscription within the subscription table. The results of each comparison are then stored in a separate table. As can easily be seen, because each event is evaluated against each subscription, and the results thereof stored, a high event rate and/or high number of subscriptions can create a tremendous processing burden and otherwise consume valuable system resources (e.g., memory).

BRIEF SUMMARY OF THE INVENTION

The above-identified deficiencies and drawbacks of current queued systems are overcome through exemplary embodiments of the present invention. Please note that the summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In one embodiment, methods, systems, and computer program products are provided that notify registrars of events of interest without having to compare and store the results of each event against each subscription. In this embodiment, a canonical subscription is applied to events in order to determine and store event records with a superset of common properties prior to applying a subscription's individual filter criteria. An event to a data store is identified as having occurred, which corresponds to one or more subscriptions that include individual filter criteria requesting notification of the event. An event record is then generated that includes information about properties of the event for subsequently applying against the individual filter criteria for the one or more subscriptions requesting notification of the event. Further, as previously mentioned, the properties of the event are compared against a canonical subscription for determining a superset of properties for the event that match a superset of common properties for a plurality of different events. Based on the comparison, the event record is stored in an event table, which is a list of event records for the plurality of different events.

Other embodiments provide for methods, systems, and computer program products for determining a subset of event records for evaluation against a subscription's filter criteria, while ensuring that event records for out of sequence, uncommitted events are not lost. This embodiment receives a request for a subset of event records that include information about properties of events that have occurred against a data store that is of interest to a subscription. The request includes an index value used in determining a first event record index for the subset of event records that have become available since a previous request. An uncommitted list is then accessed that includes a list of uncommitted event indexes for determining a last event record index based on the smallest uncommitted event index value that is greater than the first event record index. Using the first and last event record indexes, a subset of event records is determined for subsequent evaluation against the subscription's filter criteria.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1A:
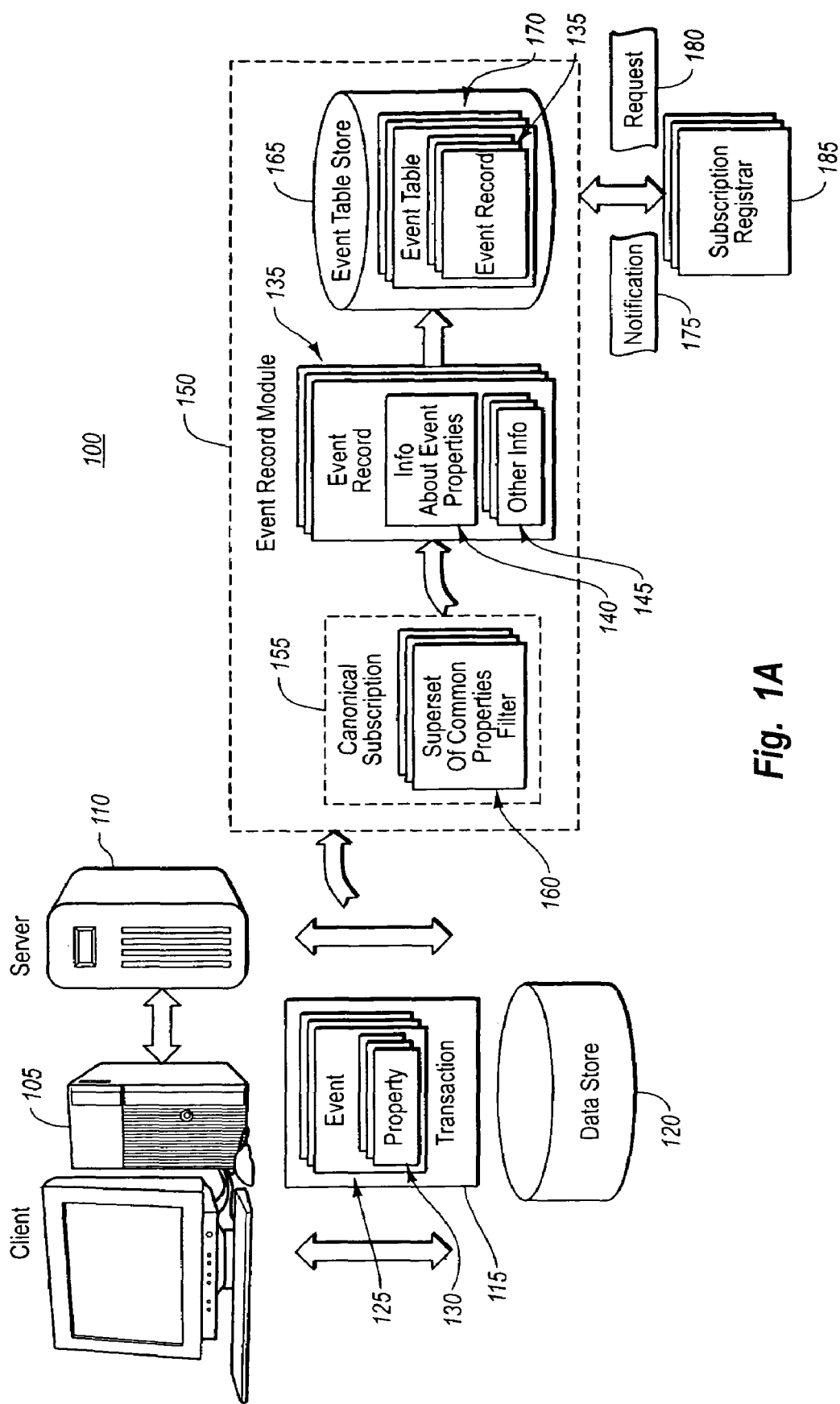
FIG. 1A illustrates a pub-sub system wherein event properties are compared against a canonical subscription in accordance with example embodiments.

The present invention extends to methods, systems, and computer program products for notifying registrars of events of interest without having to compare and store the results of each event against each subscription. The embodiments of the present invention may comprise a special purpose or general-purpose computer including various computer hardware or modules, as discussed in greater detail below.

Embodiments provide for an architecture that is independent of the number of subscriptions, which is fundamentally different approach than existing pub-sub solutions. Exemplary embodiments of the present invention neither evaluate, nor store the results of, each event against each subscription. Instead, a canonical subscription is determined a priori, which includes a superset of common property filters for similar events. Events happening in a data store are evaluated against this canonical subscription and the results are stored typically once as event records. When a subscription registrar requests notification of events that match a subscription's filter criteria, only the subset of event records corresponding to the appropriate superset of common properties are evaluated against the subscription. For a large number of different subscriptions, this reduction in the amount of events compared to subscriptions substantially reduces the processing burden and frees up valuable system resources for other threads. The follow illustrates one example of how the present invention can be utilized to reduce the number of events compared against the number of subscriptions.

In an email service environment, one group of subscriptions may care about urgent messages, appointments, junk mail, or other similar events. Another group of subscriptions, however, may be concerned with actions that are performed on specific folders or files. Although the individual subscriptions will have varying filter criteria such as specific mailboxes, specific items, specific folders, etc., properties for these events can be divided into two supersets of common properties: "received messages" and "CRUD operations" (i.e., operations that create, read, update, and/or delete items, e.g., folders, messages, etc.). Accordingly, as events occur in a data store, the properties of the events are compared against a canonical subscription that includes a filter for "received messages" and a filter for "CRUD operations". For matching events, event records are created and filtered in accordance with the superset of common properties and stored in event tables (i.e., one table for "received messages" and one table for "CRUD items").

Subscriptions with a match to the superset of common properties can search for event records of interest within the individual tables. These subscriptions may then apply their individual filters to the subset of events for which they have matching properties, e.g., interest in a specific file, folder, mailbox, etc. In other words, the group of subscriptions interested in the "received messages" superset will not need to compare their individual filter criteria against the event records in the "CRUD operation" table. Similarly, the group of subscriptions interested in the "CRUD operations" superset will not need to compare their individual filter criteria against the event records in the "received message" table. As can be seen, the greater the number of supersets, the fewer event records that each of the subscription's filter criteria need to be applied against; thus, the greater the increase in efficiency and use of valuable computing resources.

Note that although the above example applied to email messaging systems, the present invention is not limited to any particular type of system. In fact, any type of queued or pub-sub system that provides notification of events may utilize various advantageous features of the present invention. Further, it should be noted that the superset of common properties may vary based on the particular type of events, industry wisdom, or other considerations. For example, the above "received messages" may be further broken down into a superset of common properties for urgent messages, appointments, junk mail, etc. Accordingly, any specific reference to a particular queued or pub-sub system, or any particular superset of common properties, is used herein for illustrative purposes only and is not meant to limit or otherwise narrow the scope of the present invention unless explicitly claimed.

Prior to describing further details for various embodiments of the present invention, a suitable computing architecture that may be used to implement the principles of the present invention will be described with respect to FIG. 4. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 4:
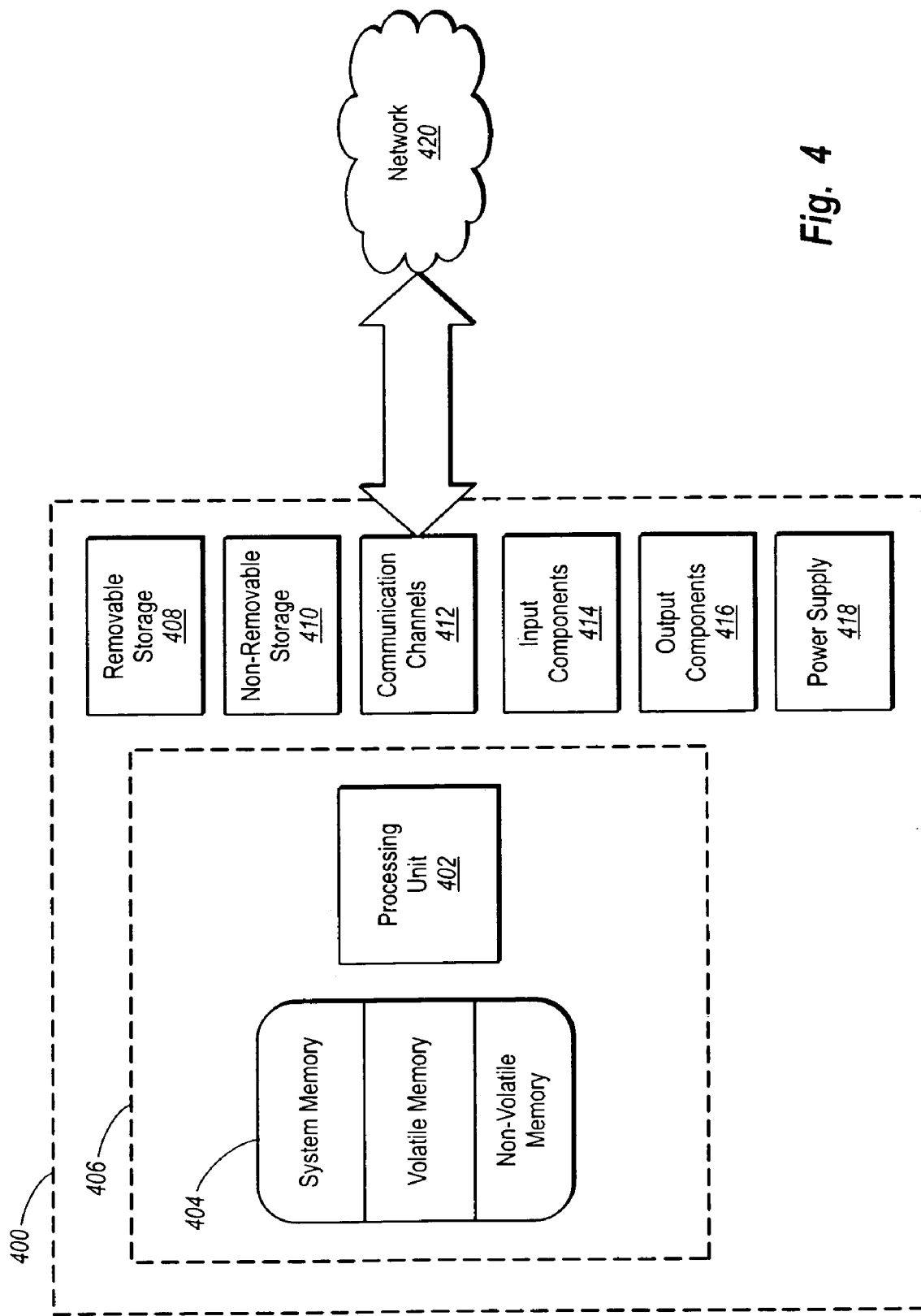
FIG. 4 illustrates an example computing system that provides a suitable operating environment for implementing various features of the present invention.

FIG. 4 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 4.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 400 typically includes at least one processing unit 402 and memory 404. The memory 404 may be volatile (such as RAM), non-volatile (such as ROM, flash memory, etc.), or some combination of the two. This most basic configuration is illustrated in FIG. 4 by the dashed line 406. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 4 by removable storage 408 and non-removable storage 410. Computer-storage media include volatile and non-volatile, removable and non-removable media implemented in any method or technology for storage of information such as computer-readable instructions, data structures, program modules, or other data. Memory 404, removable storage 408, and non-removable storage 410 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modulates running on a computing system.

Computing system 400 may also contain communication channels 412 that allow the host to communicate with other systems and devices over, for example, network 420. Communication channels 412 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 400 may also have input components 414 such as a keyboard, mouse, pen, a voice-input component, a touch-input device, and so forth. Output components 416 include screen displays, speakers, printer, etc., and rendering modules (often called "adapters") for driving them. The computing system 400 has a power supply 418. All these components are well known in the art and need not be discussed at length here.

FIG. 1A illustrates a pub-sub computing system 100 configured to give notification 175 to subscription registrars 185 for events of interest, without having to compare and store the results of each event against each subscription. The computing system 100 may be similar to the computing system 400 described above with respect to FIG. 4, although that need not be the case. As shown, client 105 or server 110 may be used to invoke various transactions 115 upon a data store 120. Such transactions 115 may have one or more events 125, and each event 125 will have one or more properties 130 associated therewith. As would be appreciated, however, events 125 within a single transaction 115 may either commit as a whole or fail as a whole. Nevertheless, each event 125 is passed to event record module 150 wherein the event properties 130 are compared against a canonical subscription 155. An event record 135 is then created for each event 125 that has properties 130 that match a superset of common property filters 160.

Note that although the event 125, and the properties thereof 130, are compared against the canonical subscription 155 whereupon an event record 135 is then generated, the present invention is not limited to such ordering. For example, event record 135 maybe generated based on the properties of event 125 and then the properties within the event record 135 may be compared against the canonical subscription 155. Accordingly, any particular ordering or comparing of event properties 130 and event records 135 against the canonical subscription 155 is used herein for illustrative purposes only and is not meant to limit or otherwise narrow the scope of the present invention.

Regardless of when event record 135 is generated, the event record will typically include various information about the event properties 140 and other information 145. In order to appropriately compare the event record 135 with a subscription registrar 185 filter criterion, as will be discussed in greater detail below, the information about properties 140 should contain specific details about the properties of an event 125. For example, the information about the properties 140 should contain the type of event (e.g., create item, delete folder, incoming urgent message, appointment, etc.) and identify an item within the data store 120 for which the type of event will be affected. Other information 145 for the event record 135 may include, if appropriate, an identifier of a folder and/or item where the event occurred and/or folder and/or item properties such as message class, folder container class, etc. Further, other information 145 will typically include an event record index uniquely identifying the event record 135, as will be discussed in greater detail below. Of course, other event information 145 may be included in the event record 135 depending upon the type of pub-sub system and the varying events within each system. Accordingly, the above-identified event record information 145 is used for illustrative purposes only and is not meant to limit or otherwise narrow the scope of the present invention unless explicitly claimed.

Once the event record 135 is generated, the event record 135 is stored in an event table 170, which is a list of event records that match the particular superset of common properties as previously described. Accordingly, there will be one event table 170 for each superset of common property filters 160 in order to accommodate all events 125 that occur within one or more transactions 115. These event tables are then stored in an event table store 165, whereupon subscription registrars 185 can request 180 those events 135 within an event table 170 for which the subscription is interested. Notification 175 of the appropriate event records 135 may subsequently be sent to subscription registrar 185 in accordance with its particular filter criteria. This process of requesting 180 and receiving notification 175 will be discussed in greater detail below with regard to FIG. 1B.

Note that the subscription registrars 185 may be one or more of any number of devices or persons. For example, the subscription registrar 185 may be a user, a client, and/or some type of assistant module that is acting on behalf of the user and/or client. Also note that the terms "subscription registrar," "subscriber," "subscription," "registrar of a subscription," and the like, are used herein interchangeably. Accordingly, these terms should be broadly construed herein to encompass a myriad of different computing devices and/or users.

As previously mentioned, event records 135 will typically have an event record index for uniquely identifying the event and/or event record from within an event table 170. (Note that terms "event index(es)", "event record index(es)", "counter index(es)", "index value(s)", or "index(es)" may be used interchangeably herein as these terms are essentially synonymous). Such indexing is useful for determining those event records 135 that have previously been evaluated against a subscription's individual filter criteria. When maintaining such indexing, however, there are a few design considerations that should be reconciled, which includes high-throughput and simple enumeration.

For example, one approach to assigning event record index values may be through the use of a Global Unique IDentifiers (GUIDs) wherein the GUIDs have no relationship whatsoever to each other. This would allow for a high-throughput since GUIDs can simply be assigned to each event record whether or not the event is committed. This solution, however, does not allow for simple enumeration. In particular, the subscription or registrar must maintain a listing of all GUIDs for which it has received event records, and pass this blob to the event table 170 or other module. The blob of GUIDs can then be compared to the indexes of each event records 135 within an event table 170. As the number of events increases, however, the storage and comparison of the indexes within the blob against each event record 135 becomes an onerous processing and storage burden slowing the notification process.

On the other hand, a scheme that uses simple enumeration to guarantee that event records will be committed in ascending order of their index values severely limits high-throughput. In particular, each event should be committed before the next index value can be assigned to another thread; thereby "funneling" all the event record creations through a single choke-point, which will reduce throughput. Simple enumeration, however, provides subscribers with simple light weight integers that can increase monotonically so that their bookmark (i.e., where a given subscriber is in the stream of event records) can be maintained simply by storing the last processed event record index. As can be seen, this design consideration has the exact opposite demand from the first in terms of wanting the tightest relationship between the index values of different event records.

Exemplary embodiments strike a balance between these two design considerations by providing a counter component or in-memory database object that holds the highest assigned index, which is typically protected by a semaphore. The counter index or value for each record is obtained by locking a counter component, incrementing the highest assigned index value, and assigning this to the current event record. The counter component is then released, so that other threads can assign other counter values. Note that this counter component or semaphore will not have a significant effect on the event throughput since the duration of holding it is extremely small, i.e., just a few in-memory lookup and assignment operations.

The catch with the above embodiment is that there is no guarantee that the transactions happening in parallel on many threads commit in the order in which they obtain the event record index. For example, thread/transaction T1 might obtain an index of 100 for its event record El while thread/transaction T2 might come after it and obtain an index value of 101 for its event record E2. It is possible, however, that T2 commits before T1, and so the counter value of 101 ends up chronologically preceding counter value 100. As such, when a subscription registrar requests records 99 to 101 before T1 commits, the event record module returns event records 99 and 101. On the next return, subscription registrar will request events records with index values greater then 101, and thus event record E2 corresponding to transaction T2 is lost.

Figure 1B:
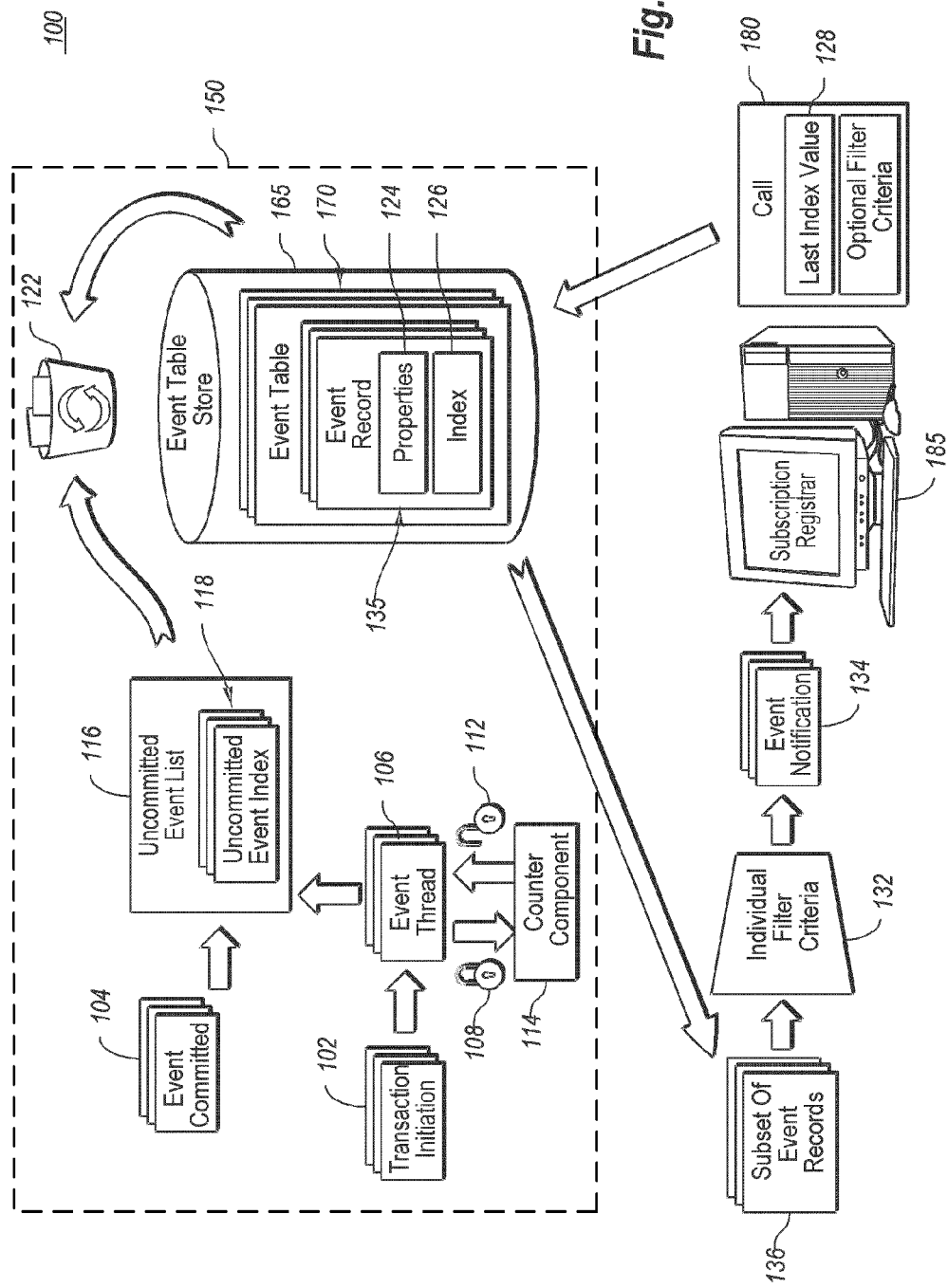
FIG. 1B illustrates a pub-sub system wherein an uncommitted event list is accessed to identify a subset of event records in accordance with example embodiments.

FIG. 1B illustrates an example pub-sub system 100 configured to overcome the above problems associated with simple enumeration for out of sequence, uncommitted events. As shown, an event record module 150 is provided for determining a subset of event records for evaluation against subscription's filter criteria. When a transaction initiates 102 in pub-sub system 100, an event thread 106 locks 108 counter component 114, which holds the highest assigned index value. As previously described, the index is obtained and the counter component is incremented to the next highest assigned index value. Counter component 114 is then released 112 so that other event threads, like event thread 106, can assign other index values. Once the event record index value is retrieved, it is stored in uncommitted event list 116, along with other uncommitted event indexes 118. As events commit 104 or abort, the uncommitted event index 118 for the appropriate event is deleted or put in recycling bin 122. This ensures that the highest uncommitted event index values 118 are the only ones maintained in uncommitted event list 116.

Note that although integers are typically used as the indexes, other forms of unique identifiers may be used for the index values. For example, the index values may be in hexadecimal, alphanumeric, or any other form used to identify a sequence or a serious of indexes. Accordingly, any specific use of an integer or other value for the indexes is used for illustrative purposes only and is not meant to limit or otherwise narrow the scope of the present invention.

As previously described, events are compared against the canonical subscription 155 and event records are created 135 that include the event properties 124 and an index value 126 as obtained from counter component 114. Each event record 135 is stored in the appropriate event table 170 within event table store 165. A subscription registrar module 185 can then periodically poll the appropriate event table 170 to determine those event records 135 that have not previously been compared to the subscriber's filter criteria. Accordingly, subscription registrar 185 makes a call 180 that includes the last index value 128, which is then used to determine the first event index 126 for the subset of event records 135 for subsequent comparison against the individual filter criteria 132

As shown in FIG. 1B, the call 180 may also include optional filter criteria. This will allow the event record module 150 to post-filter the determined subset of event records 136 before returning event notifications 134 to subscription registrar 185. Alternatively, the subscription registrar 185 may receive all of the subset of event records 136, as will be described in greater detail below, and filter the subset of event records 135 on its own.

In any event, in order to determine the subset of event records 136 to be evaluated against the individual filter criteria 132, event record module 150 will access uncommitted event list 116 to determine the smallest uncommitted event index value that is greater than the last index value 128 or the determined first index value used for the subset of event records 136. Any event records whose index value is higher than this lowest uncommitted event index 118 will not be included in the subset of event records 136 that are evaluated against the individual filter criteria 132. Accordingly, the last index value 128 in a subsequent call 180 from the subscription registrar 185 will be a number below the smallest uncommitted index 118, which will return event records that have become committed 104 after the last poll.

Figure 1C:
FIG. 1C illustrates a time line of committed and uncommitted events that gives an example of how a subset of event records may be determined in accordance with example embodiments.

Note that there is no guarantee that there are not holes for indexes of the subset of event records 136. In particular, those events that have aborted will leave holes in the sequence indexes for the subset of event records 136 that are returned and evaluated against individual filter criteria 132. FIG. 1C illustrates such a time line of committed and uncommitted events with index holes. Events 21, 22, 25, 26, 29, 31 and 34 with darkened bullets indicate events that have committed, while events with blank bullets represent uncommitted events.

Notice the permanent holes, e.g., event indexes 23 and 24. As previously mentioned, these might be due to an aborted transaction. Exemplary embodiments make no assumption that the index numbers are strictly sequential. Further, events with indexes 28, 33, and 35 are uncommitted as indicated by the open circles, i.e., there are outstanding transactions for these events. Accordingly, as previously mentioned, when a subscription registrar 185 calls 180 to read from the event history table 170, the subset of event records 136 returned will be capped below index 28, the lowest uncommitted event index value. If on the other hand events with indexes 29 and 31 where returned then event 28 would be lost—at best could be pushed down as a complex sink blob that is best avoided. In any event, the lifetime of such uncommitted transactions or events ought to be very small and hence the small extra latency for making the committed events 104 visible should be acceptable.

Once the subset of event records 136 is determined, they can be evaluated against the individual filter criteria 132, as previously described, and event notifications 134 may be issued to the subscription registrar 185. Note that the above determination of a subset of event records 136 has little, if any, effect on the overall event throughput of the system, i.e., events still get committed to disk at a high rate without bottlenecks. Only the subscription registrar 185 interested in the event records are delayed a small time to read the last event records 135, i.e., until it can be determined that there are no holes in the returned subset of event records 136. This is, however, a short time since the time between when an event index was assigned to an event (right near its committed stage), to when it actually gets committed to disk is measured in milliseconds at most (i.e., this is not an extremely effectible time widow change).

In another example embodiment, given that event records 135 are generated and stored globally based on the canonical subscription 155, rather than one per subscription, the deletion of these event records may also be handled automatically by the event record module 150. Embodiments provide for a background process that can periodically delete event records 135 older then a predetermined time period, e.g., one month. Note, however, that other well known ways for automatically deleting event records 135 are also available to the present invention. For example, event records 135 may be deleted on the basis that all subscriptions associated with the event 125 have been notified. Accordingly, other well known ways of identifying and deleting event records 135 are also available to the embodiments herein.

Also note that although the above example processes (e.g., counter component, conical subscription module, etc.) are shown as occurring in individual components or modules, the present invention is not limited to any such configuration or location of components and/or modules. For example, the data store 120 may include the event record module 150 and perform all or some of the corresponding functionality as previously described. Accordingly, the configuration and individual of any component and/or module is used herein for illustrative purposes only and is not meant to limit or otherwise narrow the scope of the present invention unless explicitly claimed.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIGS. 2 and 3—is used to indicate the desired specific use of such terms.

Figure 3:
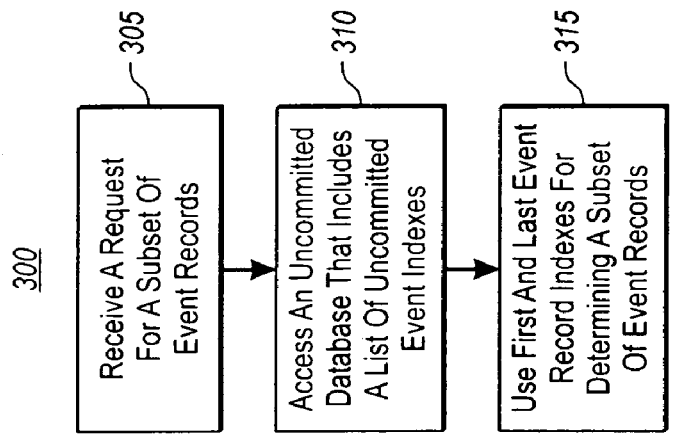
FIG. 3 illustrates a flow diagram of a method of determining a subset of event records for evaluation against a subscription's filter criteria in accordance with exemplary embodiments of the present invention.
Figure 2:
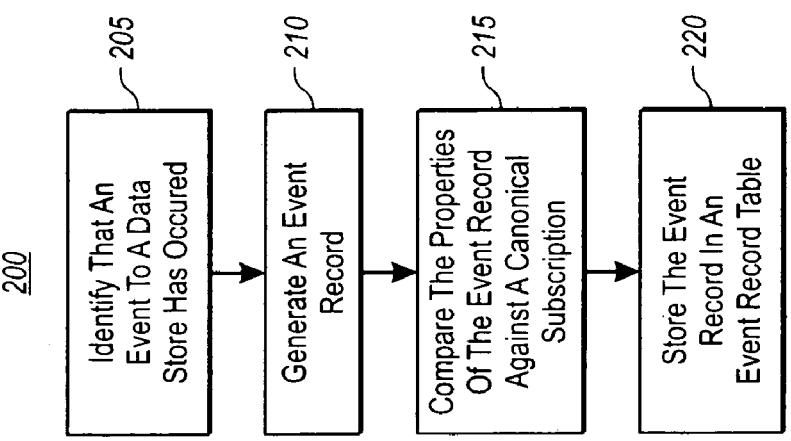
FIG. 2 illustrates a flow diagram of a method of notifying registrars of events of interest in accordance with example embodiments.

FIGS. 2 and 3 illustrate flow diagrams for various exemplary embodiments of the present invention. The following description of FIGS. 2 and 3 will occasionally refer to corresponding elements from FIGS. 1A-C. Although reference may be made to a specific element from these FIGS., such elements are used for illustrative purposes only and are not meant to limit or otherwise narrow the scope of the present invention unless explicitly claimed.

FIG. 2 illustrates a flow diagram for a method 200 of notifying registrars of events of interest without having to compare and store the results each event against each subscription. In this embodiment, a canonical subscription is applied to events in order to determine and store event records with a superset of common properties prior to applying a subscription's individual filter criteria. Method 200 includes an act of identifying 205 that an event to a data store has occurred. For example, client 105 or server 110 may invoke a transaction 115 wherein one or more events 125 with various properties 130 occur on data store 120. As such, these events 125 may be identified as corresponding to subscriptions that include individual filter criteria requesting notification of the event 125. As previously mentioned, the event 125 may be part of a transaction 115 that includes a plurality of events 125, wherein the plurality of events 125 either commit as a whole or fail as a whole.

Method 200 also includes an act of generating 210 an event record. For example, event record 135 may be generated for an event 125, which includes information 140 about properties 130 of the event 125 for subsequently applying against the individual filter criteria for the one or more subscriptions or subscription registrar modules 165 requesting notification of the event. Method 200 further includes an act of comparing 215 the properties of the event record against a canonical subscription. For example, the properties 130 of event records 125 may be compared against canonical subscription 155 for determining a superset of properties for the event that match a superset of common properties for a plurality of different events. In other words, the properties 130 of event 125 are compared against the superset of common property filters 155 that determine a core set of properties for a plurality of subscriptions.

Based on the comparison, Method 200 then includes an act of storing 220 the event record in an event record table. For example, upon comparing the event 125 to the canonical subscription 155 and generating event record 135, the event record 135 can be stored in an event table 170 in event table store 165. A subscription registrar 185 may then subsequently request 180 event records 135 from an event table 170 and notification 175 can be received accordingly.

Other embodiments provide for locking a counter component 114 for obtaining an event index 126 that is included in the event record 135. Further, the counter component 114 is incremented to a next event index value. The counter component 114 is then released 112 so that other event threads 106 can assign other event indexes as appropriate. Still other embodiments provide for storing the event index 118 in an uncommitted event list 116, and upon receiving an indication that the event has committed 104 or aborted, removing 122 the event index from the uncommitted event list 116.

Other exemplary embodiments provide that prior to receiving an indication that the event has committed 104 or aborted, a request is received for a subset 136 of the plurality of different event records 135. In such embodiment, a first event record index (not shown) is identified using an index value received in the request for the subset (e.g., last index value 128). Typically, the index value will correspond to a last event record index 128 for a last event record 135 evaluated against the subscriptions filter criteria 132. The uncommitted event list 116 is then accessed for determining a last event record index, which is a smallest index value in the uncommitted event list 116 that is larger then the first event record index. Based on the first and the last event record indexes, the subset is identified wherein the subset includes event indexes that are lower in value then the last event index, but equal to or greater then the first event index. The subset of event records 136 may then be evaluated against the subscriber's or individual filter criterion 132 to determine those event records from the subset 136 for which the subscription registrar 185 is interested. Further, access to the counter component 114 may be protected by a semaphore.

Note that when the data store is a mail server, the canonical subscription may include filters for the superset of common properties 160 for one or more of a CRUD operation for a message or folder, events for one or more mailboxes, or a message class. Further, the event record 135 may be automatically deleted 122 from the event record table 170 after a predetermined amount of time, or the record may be automatically deleted 122 from the event record table upon receiving an indication that all relevant subscribers have received notification of the event 125.

FIG. 3 illustrates a flow diagram of a method 300 for determining a subset of event records for evaluation against a subscription's filter criteria, while ensuring that event records for out of sequence, uncommitted events are not lost. Method 300 includes an act of receiving 305 a request for a subset of event records. For example, subscription registrar 185 can make a call 180 to the event record module 150 requesting a subset of event records 136, which include information about properties of events 125 that have occurred against a data store 120 that is of interest to a subscription. The request will include an index 128 used in determining a first event record index for the subset of event records 136 that have become available since a previous request. The subset of event records 136 may be stored in an event record table 170 that includes a plurality of different event records 135 that have a common superset of properties that were filtered 160 into the event record table 170 using a canonical subscription 155. In the event that the data store is an email server, the canonical subscription includes filters 160 for the superset of common properties for one or more of a CRUD operation for a message or folder, events for one or more particular mailboxes, or a message class (e.g., messages received).

Method 300 also includes an act of accessing 310 an uncommitted event list that includes a list of uncommitted event indexes. For example, event record module 150 may access uncommitted event list 116 that includes a list of uncommitted event indexes 118 for determining a last event record index based on the smallest uncommitted event index value that is greater then the first event record index. Further, method 300 includes an act 315 of using the first and last event record indexes for determining the subset of event records for subsequent evaluation against the subscriptions filter criteria. In particular, based on the first and last event record indexes, a subset of event records 136 is determined and evaluated against individual filter criteria 132 for returning event notifications 134 to the subscription registrar 185. In some embodiments, the subset of event records may be a nonconsecutive, sequential order (i.e., there may be holes for events that have been aborted).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a pub-sub (published/subscribed) computing system, a method of notifying registrars of subscriptions of one or more events of interest without having to compare and store results of each event against each subscription, the method comprising:

the pub-sub computing system identifying two different event tables, the two different event tables including a first event table comprising a received messages table and a second event table comprising a CRUD (create, read, update and delete) operations table, wherein the two different event tables correspond to first and second filters, respectively, that each comprise a superset of common properties related to different event records that are created and filtered in accordance with the first and second filters to identify corresponding subscriptions having corresponding individual filter criteria;

the pub-sub computing system identifying that an event to a data store has occurred, the event corresponding to one or more subscriptions that include individual filter criteria requesting notification of the event;

the pub-sub computing system generating an event record that includes at least information about properties of the event to apply against the individual filter criteria of the one or more subscriptions requesting the notification of the event;

the pub-sub computing system comparing the properties of the event against at least one of the first and second filters to determine a superset of properties associated with the event and that matches the superset of common properties of the first or second filters, wherein the superset of properties correspond with a plurality of different events;

the pub-sub computing system, based on the comparison, storing the event record in the first event table or, alternatively, the second event table;

the pub-sub computing system identifying a subscription having the individual filter criteria corresponding to either the first or second filters and corresponding first or second event tables, respectively;

the pub-sub computing system performing a search for an event record corresponding to the individual filter criteria of the subscription, wherein the search is limited to searching one of the first and second event tables and wherein it is not necessary to compare the individual filter criteria of the subscription against all event records in both of the first and second event tables to identify the stored event relevant to the subscription;

the pub-sub computing system receiving a request for a subset of a plurality of different event records;

the pub-sub computing system identifying a first event record index using an index value received in the request for the subset, wherein the index value corresponds to a last event record index for a last event record evaluated against the filter criteria for the one or more subscriptions;

the pub-sub computing system accessing an uncommitted event list for determining that the last event record index is a smallest index value in the uncommitted event list and is larger than the first event record index; and the pub-sub computing system, based on the first event record index and the last event record index, identifying the subset, wherein the subset includes event record indexes that are lower in value than the last event record index value, but equal to or greater than the first event record index.

2. The method of claim 1, further comprising:

locking a counter component to obtain an event index that is included in the event record;

incrementing the counter component to a next event index value;

releasing the counter component, wherein releasing the counter component enables an assignment of other threads to other event indexes.

3. The method of claim 2, further comprising:

storing the event index in the uncommitted event list; and upon receiving an indication that the event has committed or aborted, removing the event index from the uncommitted event list.

4. The method of claim 3, wherein the request for the subset of the plurality of different event records is received prior to receiving the indication that the event has committed or aborted.

5. The method of claim 4, further comprising:

evaluating the subset of event records against the subscription's filter criteria to determine those event records from the subset in which a registrar is interested.

6. The method of claim 4, wherein access to the counter component is protected by a semaphore.

7. The method of claim 1, wherein the event is part of a transaction that includes a plurality of events, and wherein the plurality of the events either commit as whole or fail as a whole.

8. The method of claim 1, wherein the data store is a mail server, and wherein the subscription includes filters for the superset of common properties for one or more of a CRUD operation for a message or folder, events for one or more particular mailboxes, or a message class.

9. The method of claim 1, wherein the event record is automatically deleted from the event table after a predetermined amount of time.

10. The method of claim 1, wherein the event record is automatically deleted from the event table upon receiving an indication that all relevant subscribers have received the notification of the event.

11. In a pub-sub (published/subscribed) computing system, a computer-readable storage medium storing computer-executable instructions which, when executed by a processor, implement a method of notifying registrars of subscriptions of one or more events of interest without having to compare and store results of each event against each subscription, wherein the method includes:

the pub-sub computing system identifying two different event tables, the two different event tables including a first event table comprising a received messages table and a second event table comprising a CRUD (create, read, update and delete) operations table, wherein the two different event tables correspond to first and second filters, respectively, that each comprise a superset of common properties related to different event records that are created and filtered in accordance with the first and second filters to identify corresponding subscriptions having corresponding individual filter criteria;

the pub-sub computing system identifying that an event to a data store has occurred, the event corresponding to one or more subscriptions that include individual filter criteria requesting notification of the event;

the pub-sub computing system generating an event record that includes at least information about properties of the event to apply against the individual filter criteria of the one or more subscriptions requesting the notification of the event;

the pub-sub computing system comparing the properties of the event against at least one of the first and second filters to determine a superset of properties associated with the event and that matches the superset of common properties of the first or second filters, wherein the superset of properties correspond with a plurality of different events;

the pub-sub computing system, based on the comparison, storing the event record in the first event table or, alternatively, the second event table;

the pub-sub computing system identifying a subscription having the individual filter criteria corresponding to either the first or second filters and corresponding first or second event tables, respectively;

the pub-sub computing system performing a search for an event record corresponding to the individual filter criteria of the subscription, wherein the search is limited to searching one of the first and second event tables and, wherein it is not necessary to compare the individual filter criteria of the subscription against all event records in both of the first and second event tables to identify the stored event relevant to the subscription;

the pub-sub computing system receiving a request for a subset of a plurality of different event records;

the pub-sub computing system identifying a first event record index using an index value received in the request for the subset, wherein the index value corresponds to a last event record index for a last event record evaluated against the filter criteria for the one or more subscriptions;

the pub-sub computing system accessing an uncommitted event list for determining that the last event record index is a smallest index value in the uncommitted event list and is lamer than the first event record index; and the pub-sub computing system based on the first event record index and the last event record index, identifying the subset, wherein the subset includes event record indexes that are lower in value than the last event record index value, but equal to or greater than the first event record index.

12. The computer program product of claim 11, further comprising computer executable instructions that cause the pub-sub computing system to:

lock a counter component for obtaining an event index that is included in the event record;

increment the counter component to a next event index value; and release the counter component, wherein releasing the counter component enables an assignment of other threads to other event indexes.

13. The computer program product of claim 12, further comprising computer executable instructions that cause the pub-sub computing system to:

store the event index in the uncommitted event list; and upon receiving an indication that the event has committed or aborted, remove the event index from the uncommitted event list.

* * * * *